(12) United States Patent
Mahathalagalage

(10) Patent No.: US 10,932,984 B2
(45) Date of Patent: Mar. 2, 2021

(54) ENHANCED MULTI-USE MOBILITY DEVICE AND BRAKING SYSTEM

(71) Applicant: Nemindra Mahathalagalage, Mobile, AL (US)

(72) Inventor: Nemindra Mahathalagalage, Mobile, AL (US)

( * ) Notice: Subject to any disclaimer, the term of this patent is extended or adjusted under 35 U.S.C. 154(b) by 0 days.

(21) Appl. No.: 16/814,815

(22) Filed: Mar. 10, 2020

(65) Prior Publication Data

US 2020/0317168 A1 Oct. 8, 2020

Related U.S. Application Data

(60) Provisional application No. 62/831,072, filed on Apr. 8, 2019.

(51) Int. Cl.
| | | |
|---|---|---|
| *A61H 3/02* | (2006.01) | |
| *A61H 3/04* | (2006.01) | |
| *B60T 7/10* | (2006.01) | |
| *B60T 1/06* | (2006.01) | |
| *A45B 3/00* | (2006.01) | |
| *A61H 3/00* | (2006.01) | |

(52) U.S. Cl.
CPC .............. *A61H 3/04* (2013.01); *A45B 3/00* (2013.01); *A61H 3/02* (2013.01); *B60T 1/062* (2013.01); *B60T 7/10* (2013.01); *A61H 2003/005* (2013.01); *A61H 2003/046* (2013.01); *A61H 2201/0107* (2013.01); *A61H 2201/0192* (2013.01)

(58) Field of Classification Search
CPC .............. A61H 3/04; A61H 2003/005; A61H 2003/046

USPC .............. 135/66, 74, 85; 280/87.01, 87.021, 280/87.041, 87.05, 7.15, 47.34, 267, 639
See application file for complete search history.

(56) References Cited

U.S. PATENT DOCUMENTS

| | | | | |
|---|---|---|---|---|
| 7,261,114 | B2 * | 8/2007 | Karasin | A61H 3/00 |
| | | | | 135/85 |
| 8,523,211 | B2 * | 9/2013 | Mailahn | A61H 3/04 |
| | | | | 280/263 |
| 10,617,591 | B1 * | 4/2020 | Neville | B62K 5/003 |

(Continued)

FOREIGN PATENT DOCUMENTS

| | | | | |
|---|---|---|---|---|
| CN | 102973394 A | * | 3/2013 | |
| EP | 3556338 A1 | * | 10/2019 | .............. A61H 3/04 |

OTHER PUBLICATIONS 3 pages PDF titled "A Knee-T Cricth on Wheels" by Chris Burns, Feb. 17, 2010, found at https://www.yankodesign.com/2010/02/17/a-knee-t-crutch-on-wheels/. (Year: 2010).*

*Primary Examiner* — Robert Canfield

(74) *Attorney, Agent, or Firm* — FisherBroyles LLP; Ian R. Walsworth

(57) ABSTRACT

A convertible scooter and crutch assembly is provided that is comprised of a front assembly and rear assembly. The front assembly is preferably pivotably, rotatably or equivalently interconnected to the rear assembly. In a first configuration, the convertible scooter is configured as a scooter that employs a handlebar, wheels, and a knee rest. In a second configuration, the front assembly and rear assembly is aligned in a liner manner to form a crutch. The convertible scooter is easy to manipulate, store and use.

10 Claims, 11 Drawing Sheets

(56) References Cited

U.S. PATENT DOCUMENTS

| | | | | |
|---|---|---|---|---|
| 2003/0098051 | A1* | 5/2003 | Fismer | A61H 3/02 135/66 |
| 2004/0217565 | A1* | 11/2004 | Ramm | B62K 15/006 280/87.01 |
| 2006/0033297 | A1* | 2/2006 | Miller | B62K 3/002 280/87.021 |
| 2007/0182116 | A1* | 8/2007 | Davey | B62K 3/16 280/87.05 |
| 2011/0109058 | A1* | 5/2011 | Janis | A61H 3/04 280/263 |
| 2014/0096804 | A1* | 4/2014 | Keck | A61H 3/02 135/69 |
| 2016/0058648 | A1* | 3/2016 | Soulakis | A61H 3/02 135/68 |
| 2017/0290730 | A1* | 10/2017 | Smith | A61H 3/04 |

* cited by examiner

ENHANCED MULTI-USE MOBILITY DEVICE AND BRAKING SYSTEM

CROSS REFERENCE TO RELATED APPLICATIONS

This application claims priority to U.S. Provisional Patent Application No. 62/831,072, filed on Apr. 8, 2019, which is incorporated herein by reference in its entirety.

FIELD OF THE INVENTION

The present invention is generally directed to a wheeled apparatus, and more specifically a convertible scooter/support and braking system for improved use and mobility of a person.

BACKGROUND OF THE INVENTION

After an injury or surgery, little or no weight can be imposed on the injured limb or joint of a patient. Thus, patients frequently use crutches or knee scooters to assist with their recovery and general mobility during rehabilitation. In recent years, scooters have been favored over other types of mobility apparatus as they are safer and easier to use.

One drawback with scooters is that they are difficult to use in uneven or rough terrain and sometimes in tight spaces. Another drawback is that scooters take up more space than other apparatus, are difficult to manipulate by an injured or recovering individual, and often lack braking or other systems that are important or necessary to safe or effective operation. In addition, scooters are often required to be disassembled or folded for transport. For example, patients often store a scooter in their vehicle's trunk or back seat, which means they must make their way into or around their vehicle on an injured leg.

Those of ordinary skill in the art will appreciate that crutches or braces can be used to navigate uneven terrain, steps and other surfaces that are difficult for operation of a scooter. Crutches are also easier to use in this situation, as they can be stored in the back seat, for example, when not needed.

Further, prior art mobility devices call for rigid and often heavy components or system parts with little impact absorption. Severe vibrations from the surface the mobility devices are traveling on can create an unstable and potentially unsafe load-bearing device. Likewise, the various forces applied on the mobility device through the ground or other surface on which the device travels are translated to the person, resulting in an uncomfortable and potentially unsafe experience.

It is with these problems and shortcomings in mind that the present disclosure in contemplated.

SUMMARY OF THE INVENTION

According to one embodiment, the present disclosure relates to an apparatus that may be safely and easily converted from a first configuration to a second configuration. The apparatus is generally comprised of a front assembly comprising a handlebar at a first end and at least one front wheel at a second end, further comprising a pivot or swivel point that is interconnected to a first end of a second assembly, and which comprises a rear wheel(s) at a second end. The second assembly may accommodate an attachment, such as a knee rest, with a shaft of the attachment extending therefrom and preferably interconnected to a sleeve. In operation, a patient may grasp the handlebar and place an injured leg on a first surface of the attachment, such as a knee rest. The scooter is propelled forward with the foot of the non-injured leg.

The apparatus may be converted to a second configuration, whereby the apparatus is aligned in a substantially vertical arrangement, such that the attachment may be used to support an injured leg and preferably the shoulder joint of a person while standing. In this manner, the apparatus may be converted to permit a user to move quickly over terrain while the apparatus is in the first configuration or permit a user to move over uneven terrain while the apparatus is in a second configuration.

In another embodiment, the apparatus comprises a braking system that permits a user to selectively apply braking force to the apparatus, for example, to the wheels of the apparatus.

In varying embodiments, the system and method may comprise fewer or greater elements than outlined in this Summary. One having skill in the art will appreciate that embodiments of the present disclosure may be used in conjunction devices that employ automated or semi-automated manipulation. Embodiments of the present disclosure may be designed such that the system or methods described herein may be performed, for example, manually by an operator, remotely by an operator, remotely by an operator through a computer controller, by an operator using proportioning devices, or programmatically by a computer controller.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "automatic", "automated" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The Summary of the Invention is neither intended nor should it be construed as being representative of the full extent and scope of the present disclosure. The present disclosure is set forth in various levels of detail in the Detailed Description, and no limitation as to the scope of the present disclosure is intended by either the inclusion or non-inclusion of steps, elements, components, etc. in this Summary. Additional aspects of the present disclosure will become more readily apparent from the Detailed Description.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

In the drawings:

FIG. 1 is a front perspective view of the apparatus in accordance with embodiments of the present disclosure;

FIG. 2 is a rear perspective view of the apparatus in accordance with embodiments of the present disclosure;

FIG. 3 is a perspective view showing a patient using the convertible scooter in the first configuration;

FIG. 4 is a perspective view of the apparatus in a second configuration in accordance with embodiments of the present disclosure;

FIG. 5 is another perspective view of the apparatus in a second configuration accordance with embodiments of the present disclosure;

FIG. 6 is a perspective view showing a patient using the convertible scooter in the second configuration;

FIG. 7 is another perspective view showing a patient using the convertible scooter in the second configuration;

FIG. 8 is a perspective view showing the orientation of elements associated with a braking system in accordance with embodiments of the present disclosure;

FIG. 9 is an exploded view of a handlebar with braking assembly in accordance with embodiments of the present disclosure;

FIG. 10 is an exploded view of the wheel and braking assembly in accordance with embodiments of the present disclosure; and FIGS. 11A-11B are partial sectional views of the apparatus in accordance with embodiments of the present disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The ensuing detailed description provides embodiments only, and is not intended to limit the scope, applicability, or configuration of the claims. Rather, the ensuing description will provide those skilled in the art with an enabling description for implementing the embodiments. It should be understood that various changes may be made in the function and arrangement of elements without departing from the spirit and scope of the appended claims.

Aspects of the present disclosure are illustrated in FIGS. 1-11. The following component listing provides further details regarding reference numbers shown in the appended figures:

| Ref. No. | Component |
| --- | --- |
| 2 | Apparatus/Scooter |
| 4 | Front Assembly |
| 6 | Rear Assembly |
| 8 | Joint Coupling |
| 10 | Attachment |
| 12 | Attachment Coupling |
| 14 | Handlebar |
| 16 | Front Wheel(s) |
| 18 | Rear Wheel(s) |
| 20 | Braking System |
| 22 | Apertures |
| 24 | Grips |
| 25 | Footing |
| 26 | Rotational Joint |
| 27 | Brace |
| 28 | Shaft (of Front Assembly) |
| 29 | Locking Pin |
| 30 | Rest |
| 33 | Swivel Mount (of Front Assembly) |
| 35 | Actuator |
| 36 | Sleeve |
| 38 | Sheath |
| 40 | Collar/Cable Attachment |
| 42 | End Piece |
| 44 | Cable |
| 46 | Axle Pin |
| 47 | Housing |
| 48 | Spring |
| 49 | Spring Guide |
| 50 | Braking Block |
| 51 | Chamber (of Braking Block) |
| 52 | Braking Pad |
| 53 | Housing Cap |

Figure 1:
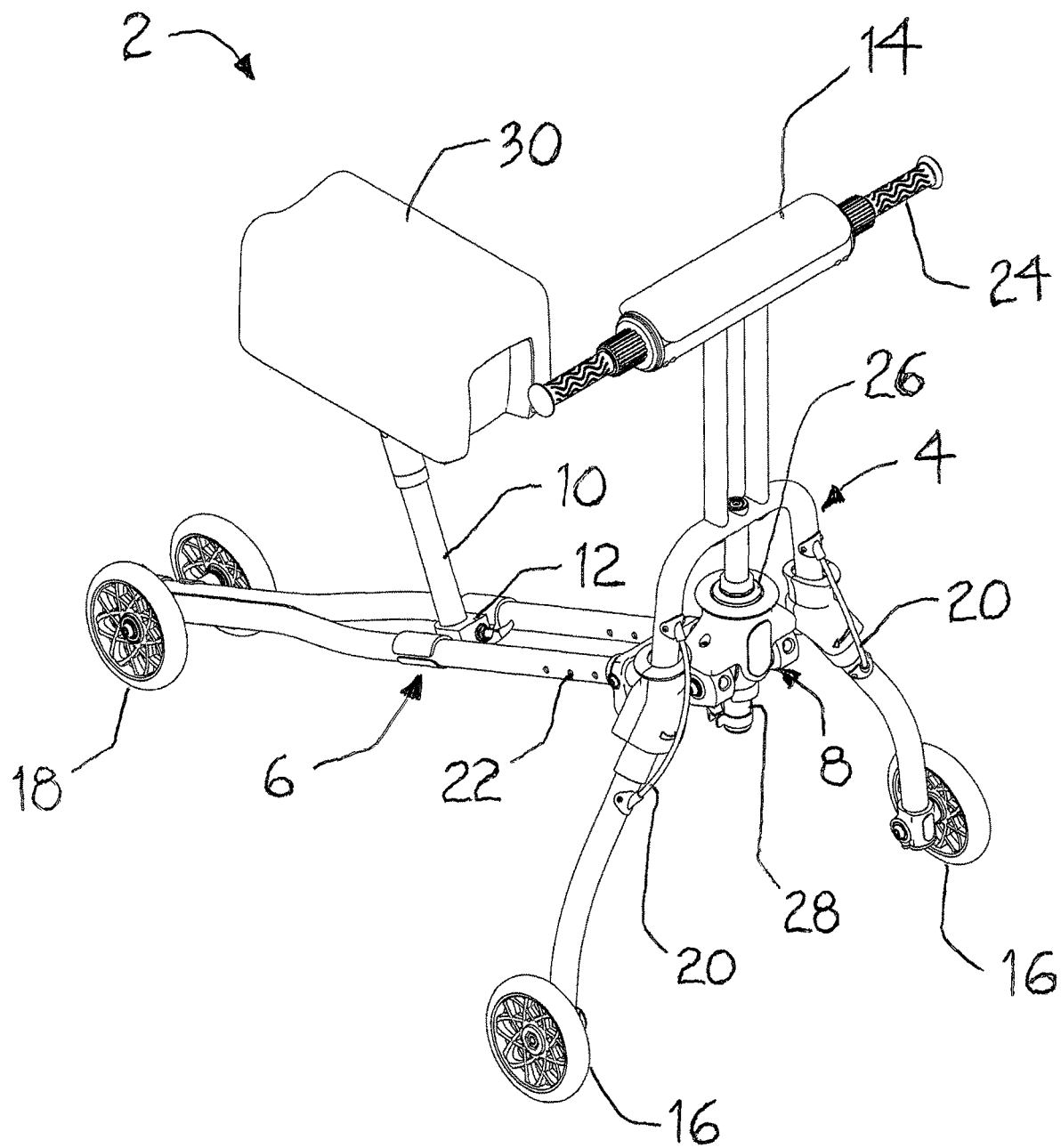

Referring now to FIG. 1, the apparatus is shown in a perspective view oriented in a first configuration, which permits use of the apparatus as a scooter. The apparatus 2 is generally comprised of a front assembly 4 comprising a handlebar 14 at a first end and at least one front wheel 16 at a second end, further comprising a joint coupling 8 that serves as a pivot or swivel point to interconnect the front assembly 4 to a first end of a rear assembly 6, and which comprises a rear wheel(s) 18 at a second end of the rear assembly 6. The rear assembly 6 may accommodate an attachment 10, such as a rest 30 for a user's knee, by way of example, with the attachment extending therefrom and preferably interconnected to an attachment coupling 12.

The handlebar 14 is typically provided with one or more grips 24 for supporting the weight of a user's upper body and to better grasp and steer the handlebar 14 when in motion. The handlebar 14 preferably adjusts by sliding a shaft 28 through a portion of the coupling joint 8 and locking in a desired position. The shaft 28, however, is preferably free to rotate relative to the rear assembly 6 by way of, for example, a rotational joint 26, thereby permitting the handlebar 14 to move the interconnected front wheel(s) 16 of the front assembly 4 and steer the scooter 2 to the left or right when in motion. The front assembly 4 may also comprise a braking system 20 operable to apply a braking force to the front wheel(s) 16.

In operation, a patient or other user may grasp the handlebar 14 and place an injured leg on a first surface of the rest 30 of the attachment 10. The scooter 2 is propelled forward with the foot of the non-injured leg. The handlebar 14 may be rotated relative to the rear assembly 6 to steer the scooter 2 and the braking system 20 (described in greater detail below) may be used to stop the forward motion of the scooter 2.

Figure 2:
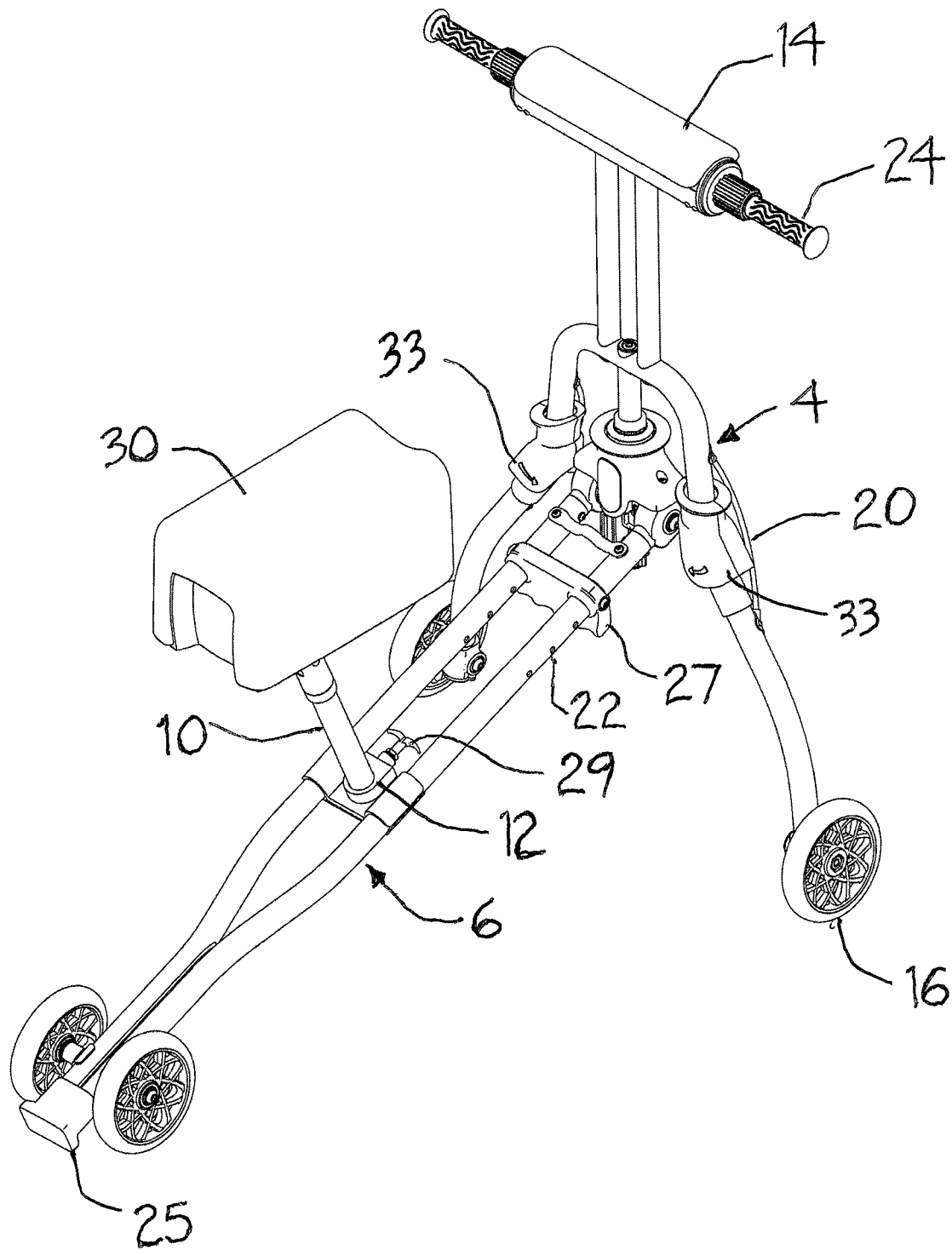

FIG. 2 is a rear perspective of the scooter 2. The wheel(s) 16 may be mounted to leg(s) and comprise a swivel mount 33 for rotating the leg(s) and thereby the wheel(s) 16 when the scooter 2 is in a second configuration (described more fully below). The shaft of the attachment 10 may also be adjustable relative to the attachment coupling 12 to accommodate differing user heights or preferences. One of ordinary skill in the art will appreciate that the rest 30 may rotate to further enhance user comfort. A locking pin 29 may be provided to secure the attachment 10 in the desired position relative to the rear assembly 6. In embodiments, the locking pin 29 may be a screw-type, a wingnut-type, or another equivalent fastener.

FIG. 2 also illustrates how the scooter 2 can selectively move to the configuration shown in FIGS. 4-7. More specifically, in some instances, it may not be convenient to use the apparatus 2 as a scooter, and so it may be desirable to fold the apparatus 2 into a second, crutch-like position of use. This accomplished by rotating the rear assembly 6 vis a vis the joint coupling until the rear assembly 6 is aligned linearly with the front assembly 4 with the second portion. A brace 27 may be provided about the mid-portion of the rear assembly 6, and may be adjusted by locking pins placed through one of several apertures 22 depending on user preference. The brace 27 may facilitate placement of a hand in a weight-bearing manner when the apparatus 2 is in the second configuration. The pivoting means may have locking features to ensure the rear assembly 6 remains in the desired configuration.

One having skill in the art will appreciate that the components of the present disclosure may be constructed of materials that are sufficiently strong/resilient and lightweight, including, for example, stainless steel, titanium, titanium alloy, aluminum, aluminum alloy, chrome, chromium alloy, and other metals or metal alloys. Components may also comprise coating, sealants, or other subtler materials known to provide comfort and/or convenient purchase by a user's hands, and may also include, for example, carbon fiber, ABS plastic, polyurethane, polyethylene, photo-polymers, resins, particularly fiber-encased resinous materials rubber, latex, synthetic rubber, synthetic materials, polymers, and natural materials.

Many of the structural components of the apparatus described herein are preferably hollow or tubular and may be easily manufactured for suitable load-bearing capacity of a range of human users. In embodiments, the apparatus may support a young child while being of sufficient strength to accommodate a 250-300 lb. adult.

Figure 3:
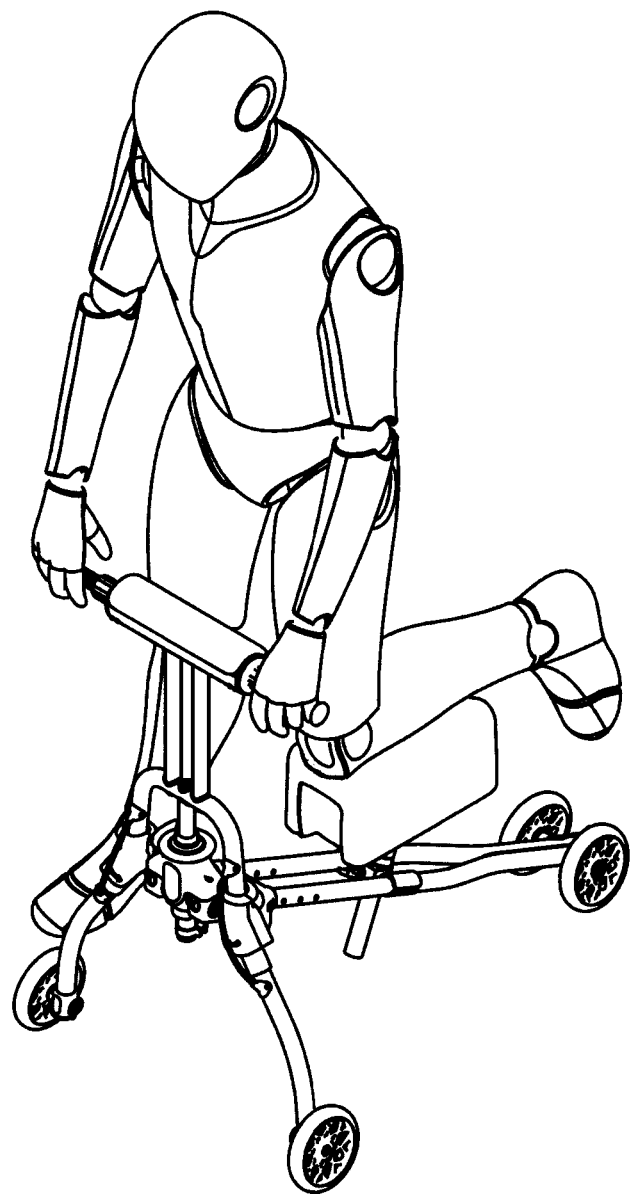

FIG. 3 is an illustration showing a patient using the scooter in the first configuration. As shown, the rear assembly 6 is narrow enough to avoid interference with a user's non-injured leg on either side of the rest 30 for pushing the scooter 2 forward. The attachment 10 of this figure has been adjusted to a lower elevation (relative to the rear assembly and floor surface) for a shorter person's use. Likewise, a taller individual may elevate the attachment 10 and thereby the rest 30 by sliding the shaft of the attachment 10 upward through the attachment joint 12.

Figure 4:
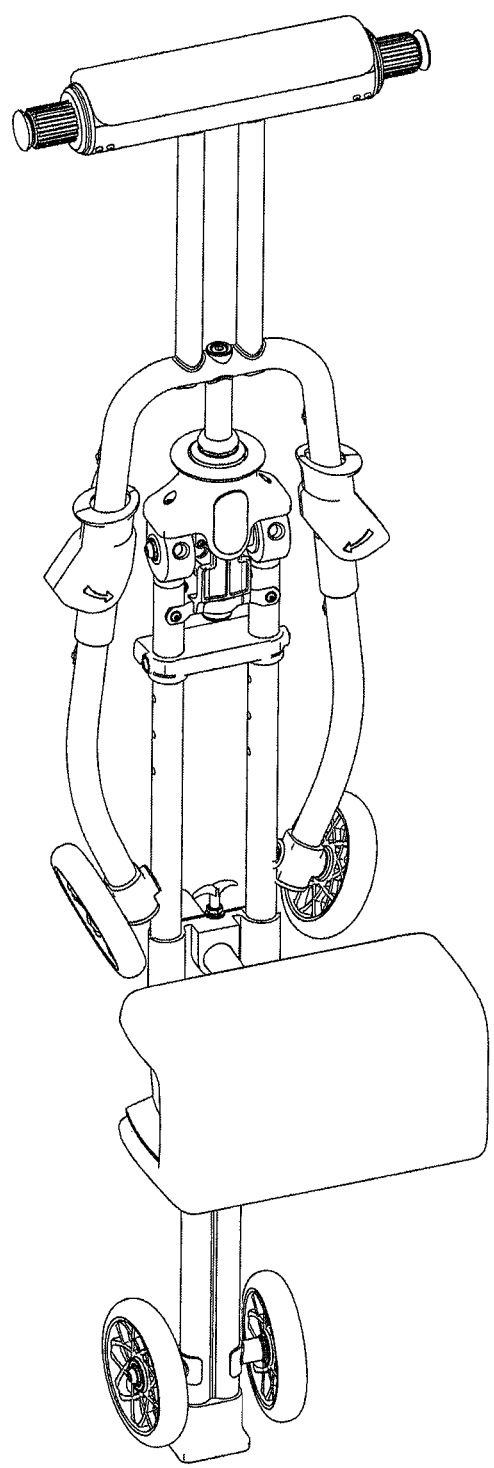
Figure 5:
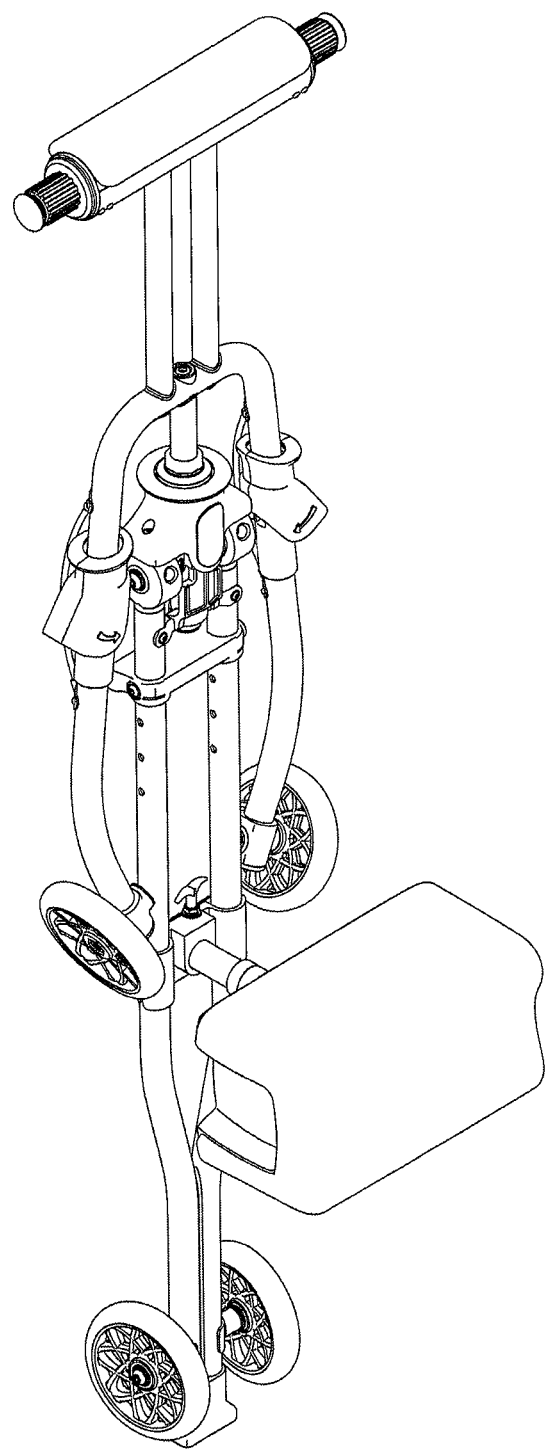

FIGS. 4-7 illustrate the second position of use wherein the apparatus 2 is configured as a crutch. Here, the front assembly 4 and the rear assembly 6 are generally aligned in a linear arrangement, such that the handlebar 14 now becomes a crutch crosspiece for placement under a shoulder joint of the user. Further, the brace 27 of the front assembly 4 functions as a handle or handhold, and the second end of the rear assembly 6 has a footing 25 that serves as a crutch end or footing. The legs/wheels 16 of the front assembly 4 may rotate vis a vis the swivel mounts 33, such that the bow of the legs is directed towards the longitudinal axis of the apparatus 2 as shown in FIGS. 4-5. Further, grips 24 may be retractable such that the major dimension of the handlebar 14 may be reduced in length for use of the apparatus 2 in the second position.

The attachment 10 may rotate relative to the attachment coupling 12 to move the rest 30. Alternatively, or additionally, the rest 30 may be configured to rotate or pivot about the opposite end of attachment 10, such that the actual rest 30 may be adjusted and secured in a desired location. The rest 30 may be locked relative to the attachment such that a second surface thereof is adapted to receive the patient's leg or other anatomy. This functionality is ideal if the patient wishes to position the rest 30 adjacent to their body and rest their leg on the rest 30 during use of the apparatus in this second configuration. Otherwise, the rest 30 may be positioned away from the patient, i.e., the opposite side of the user.

Figure 6:
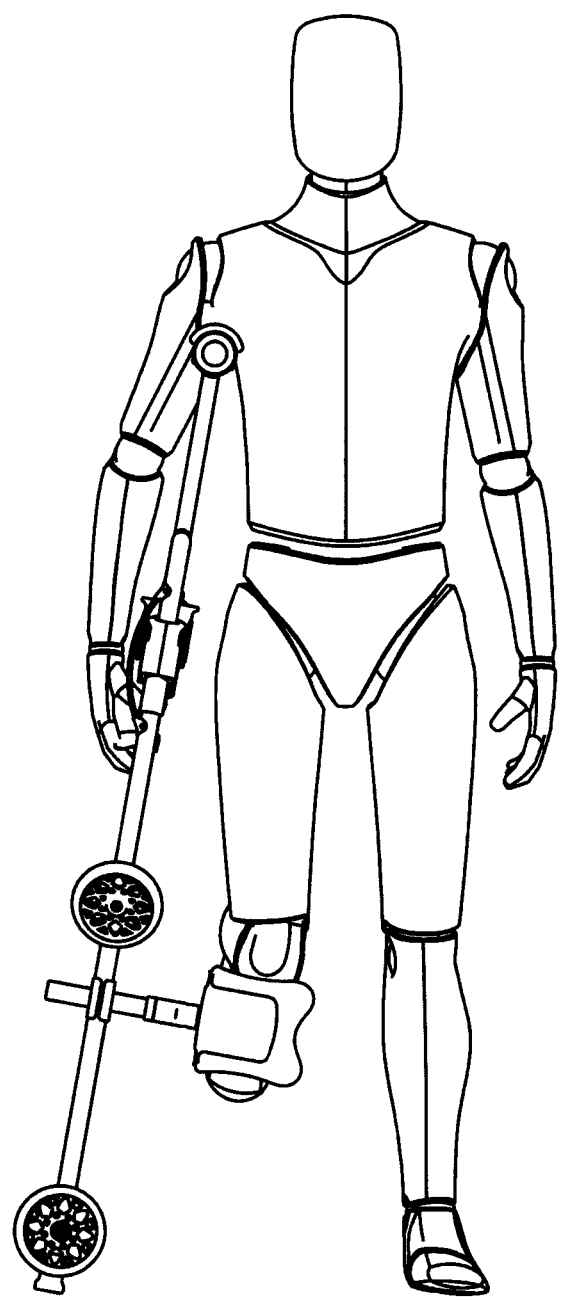
Figure 7:
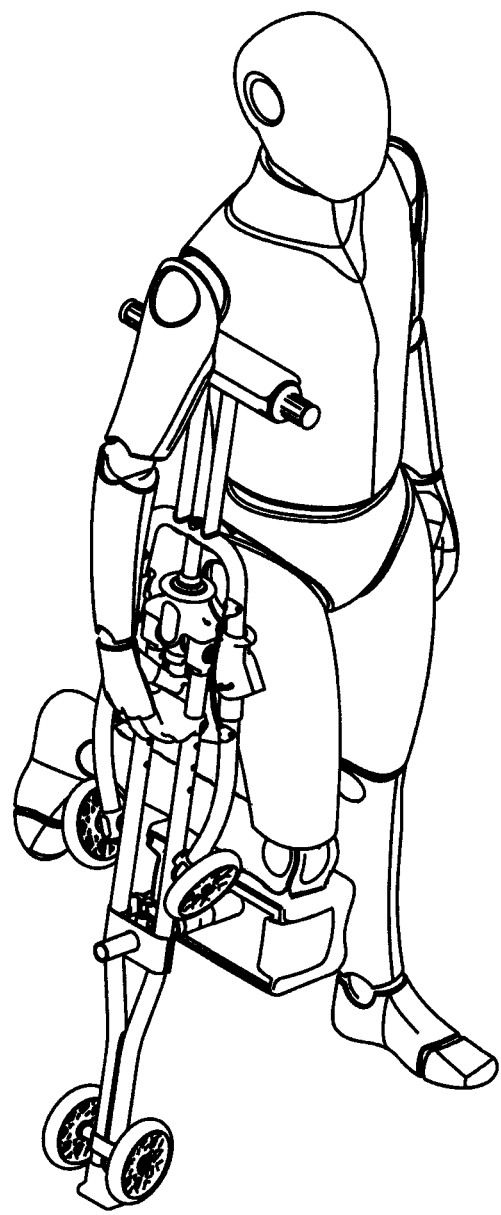

FIGS. 6 and 7 are perspective views showing a patient using the apparatus in a second configuration. Although the rest 30 is shown in use by supporting the leg of the user, the apparatus 2 may be rotated 180 degrees about the longitudinal axis of the apparatus 2 such that the rest 30 is on the opposite side of the apparatus 2 from the user, and allow the user to have more positive alignment of the crutch close to the side of their body. Thus, either position of the rest 30 may still accommodate use of the apparatus 2 in the second configuration.

Those of ordinary skill in the art will appreciate that a portion of the crutch tip may be extendable such that only the footing 25 of the rear assembly 6 will touch the ground. The footing 25 may be comprised of a tackier material to enhance locomotion. Alternatively, the wheels 16/18 and/or handlebar 14 may also be locked to prevented rotation in the second configuration. The wheels 16/18 may also be selectively removable.

Figure 8:
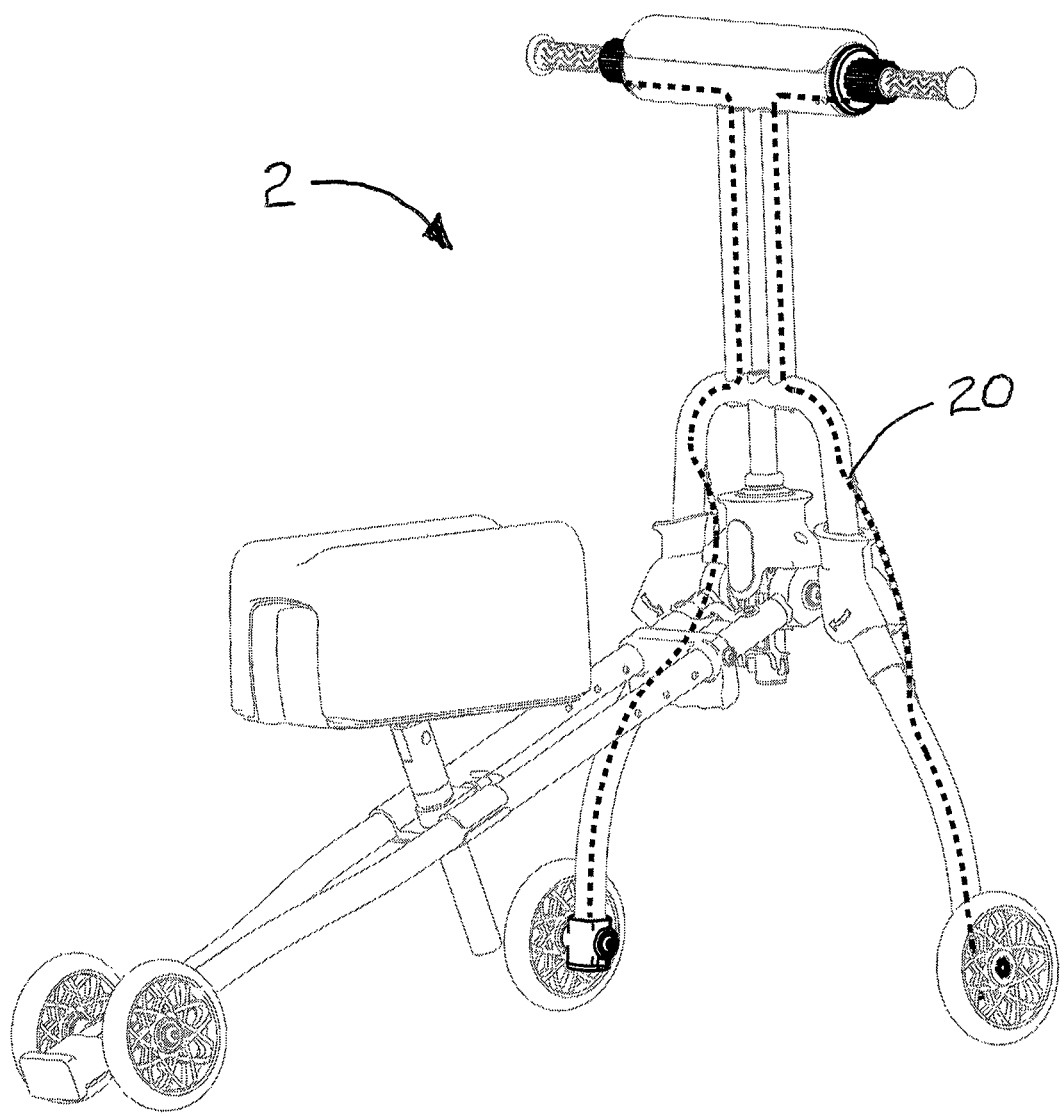

FIG. 8 shows a schematic and perspective view of the braking system 20 according to one embodiment. Here, the handlebar 14 preferably provides an actuator 35 located adjacent each of the grips 24, which actuates a braking force applied to the front wheel(s) 16. This actuation may be pneumatic or mechanical in nature, such as a cable-action mechanism, and preferably causes a braking force to be applied to all front wheels 16 of the front assembly 4. Given the preferably hollow or tubular nature of the structural components of the front assembly 4, the braking system components may be housed within the front assembly 4 and largely out of sight to the user.

Figure 9:
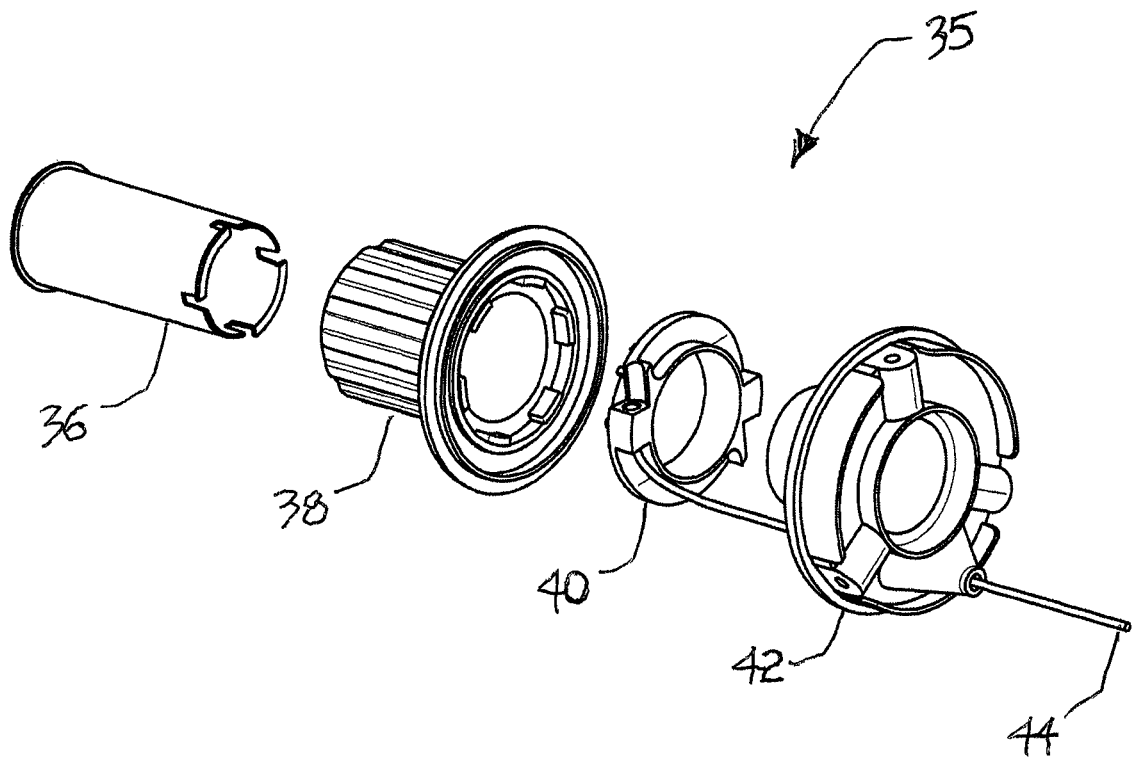

FIG. 9 shows an exploded view of the actuator 35 described above. The components of FIG. 9 are preferably located on the handlebar 14 adjacent the grip(s) 24, in a convenient location to the user's hands when the apparatus 2 is in use. However, the actuator 35 may be located elsewhere and provide the same functionality described herein. The actuator 35 is preferably comprised of mechanical linkages that apply a braking force when rotated. A sleeve 36 may be place in a sheath 38 and in combination receive a collar/cable attachment 40. The collar/cable attachment 40 in turn is securely affixed to a cable 44, which is threaded through an end piece 42. The end piece 42 also enclosed the collar/cable attachment 40, sleeve 36 and sheath 38 as one combined assembly. The cable 44 then is passed through the frame of the front assembly 4 and the legs and ultimately to the wheel(s) 16.

Figure 10:
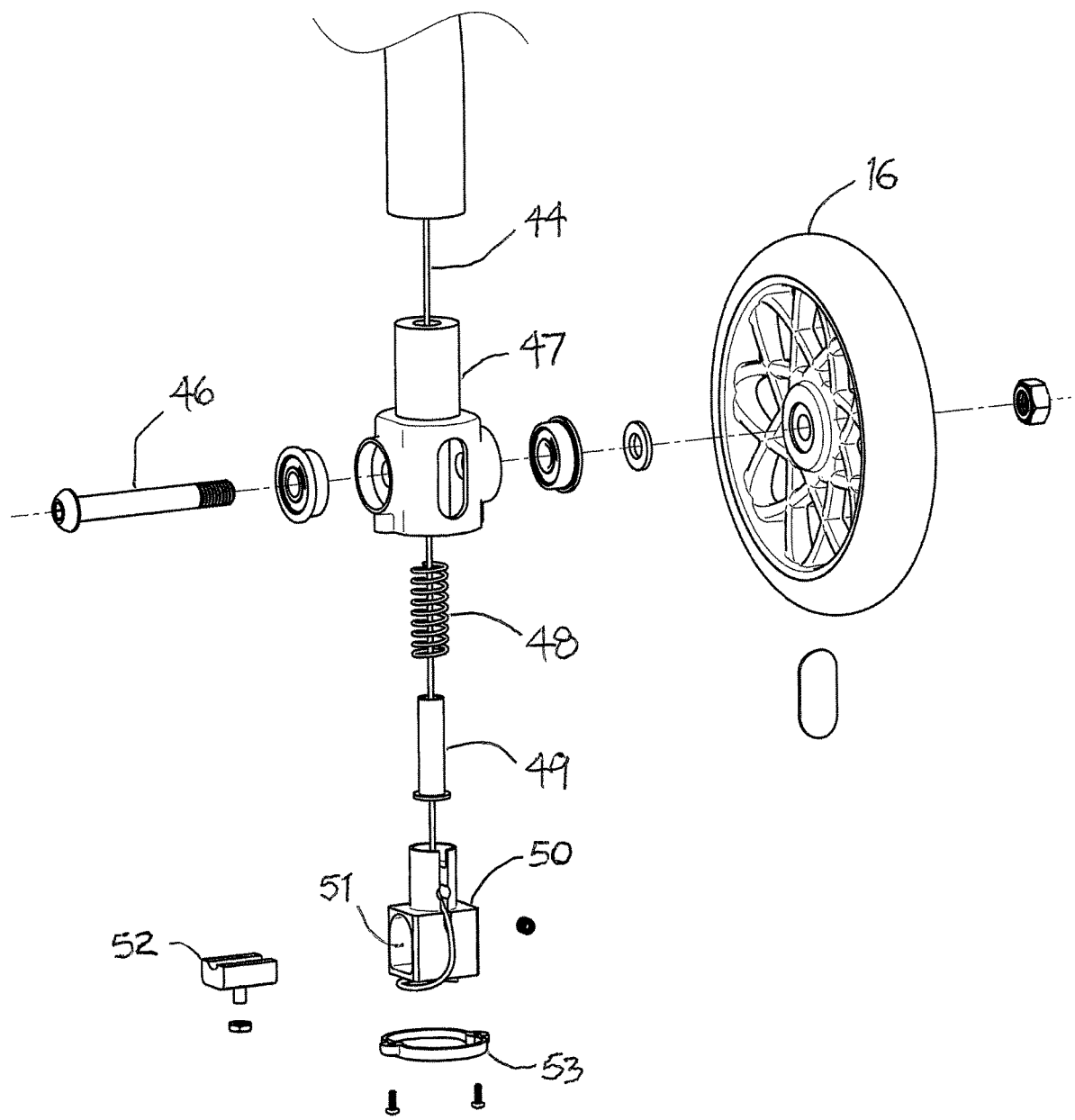

Referring now to FIG. 10, the opposite end of the braking system 20 is illustrated in an exploded view. Here, the front wheel(s) 16 may rotate via an axle pin 46. The axle pin passes through the center of wheel(s) 16 and also through housing 47. Housing 47 also contains a spring 48 and spring guide 49, which bias a braking block 50 away from the axle pin 46. Thus, the axle pin is placed through chamber 51 of the braking block 50, and through the housing 47 in a normal configuration so as to freely rotate and allow the wheel(s) to rotate without resistance.

The braking block 50 is also coupled to the cable 44 and houses a braking pad 52. The spring 48 generally biases the braking pad 52 away from the axle pin 46, unless and until the actuator 35 is actuated and the cable 44 applied force to resist the biasing force of the spring 48. This in turn causes the braking block 50 and braking pad 52 to contact the axle pin 46 and prevent further rotation of the axle pin 46. In embodiments, the braking pad 52 may comprise a tacking or slip-resistant material to promote this braking force to the axle pin 46. A housing cap 53 is provided to enclose the braking block 50 within the housing 47. In embodiments, at least a portion of the axle pin 46 may also comprise a rough or tacking surface to enhance the braking force applied by the braking assembly.

Figures 11A, 11B:
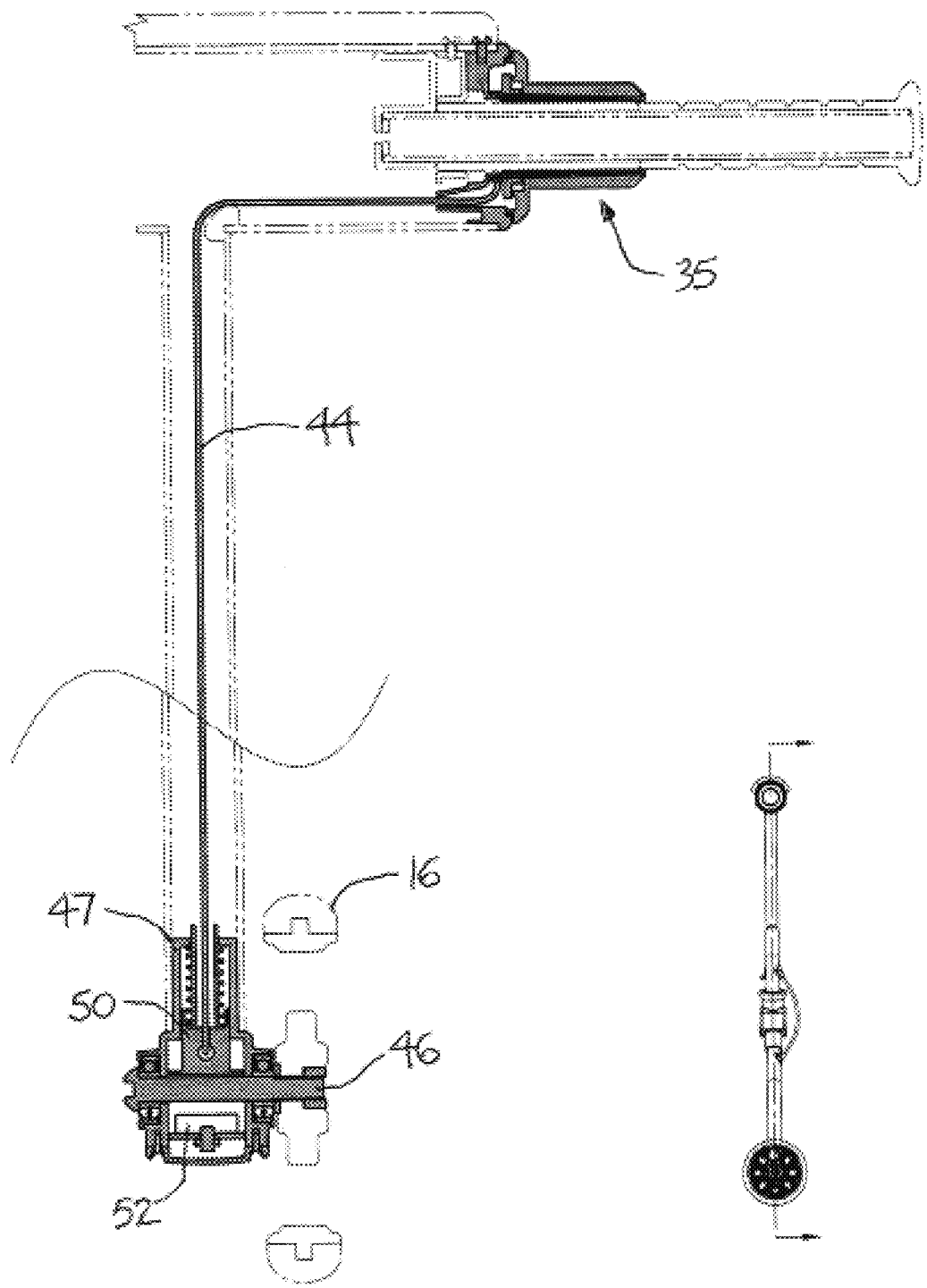

FIG. 11 shows sectional views of the front assembly 4 and the actuator 35 placed in a preferable location along the handlebar 14 and adjacent the grip 24. FIG. 11 also shows the housing 47, braking block 50, braking pad 52 and axle pin 46 relative to the opposite end of the braking system 20, located adjacent the front wheel(s) 16. The cable 44 preferably runs through the hollow or tubular structure of the front assembly between the actuator 35 and the braking block 50.

In certain embodiments, the actuator 35 may be positioned to apply a braking force and the collar/cable attachment 40 may be selectively locked in the braking position, such that a user may apply the braking force described above and remove their hands from the actuator 35 without removing the braking force. For example, the collar/cable attachment 40 may have a first position that applies no braking force, a second position that applies a braking force, and a third position that secures the collar/cable attachment 40 in a locked position and applies a braking force. Alternatively, the collar/cable attachment 40 may comprise a latch that is selectively engageable with a slot, notch or aperture located on the sleeve 36 or the sheath 38, or in certain embodiments with both. In this manner, the braking force may be applied and then secured even when the user removes their hand from the collar/cable attachment 40.

In embodiments, the apparatus 2 may comprise one or more dampening elements to dampen forces caused by the motion of the apparatus 2 in one or more planes and may further permit greater freedom of use of the apparatus 2. The dampening elements may be comprised from a variety of materials, components, or combinations thereof. For example, the dampening elements may be a spring, piston, fluid chamber or other movement reducing component. In some embodiments the dampening element may be adjustable. A person may adjust the dampening element for different activities. For example, a person may adjust the dampening element for use over more unstable terrain or during periods of sensitive recovery. In other embodiments, the components of the apparatus described above may be comprised of materials to provide a degree of dampening, including materials such as fiberglass, fiberglass laminate, wood, wood laminate, metal, metal laminate, Kevlar, carbon fiber, foam core, torsion box, cap ski, plastic, composite, carbon fiber, ABS plastic, polyurethane, polyethylene, photo-polymers, resins The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

The present inventions, in various embodiments, include components, methods, processes, systems and/or apparatuses substantially as depicted and described herein, including various embodiments, sub combinations, and subsets thereof. Those of skill in the art will understand how to make and use the present inventions after understanding the present disclosure. The present inventions, in various embodiments, include providing devices and processes in the absence of items not depicted and/or described herein or in various embodiments hereof, including in the absence of such items as may have been used in previous devices or processes, e.g., for improving performance, achieving ease and/or reducing cost of implementation.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A mobility device for use in different configurations, comprising:
   a front assembly having an upper portion comprised of a handlebar and a lower portion that includes two legs branching from the upper portion and have front wheels on the distal ends thereof;
   a rear assembly pivotably interconnected by a coupling joint to the front assembly between the upper portion and lower portion of the front assembly, and the rear assembly further comprising a second portion that includes at least one rear wheel;
   an attachment joint located on the rear assembly for selectively receiving an attachment;
   wherein the front wheels and at least one rear wheel of the front and rear assemblies permit the mobility device to support a person while rolling along a floor or similar surface;
   wherein the rear assembly is configured to selectively rotate relative to the front assembly to generally align the front assembly and the rear assembly in a linear relationship, thereby permitting the mobility device to support a person while standing or walking; and wherein the handlebar functions as a crutch crosspiece and the second portion of the rear assembly functions as a crutch tip.

2. The mobility device of claim 1 further comprising an attachment having a rest for supporting a limb of the user.

3. The mobility device of claim 1 further comprising a footing located on the distal end of the rear assembly.

4. The mobility device of claim 1, wherein the height of the handlebar relative to a floor surface is adjustable by the user.

5. The mobility device of claim 1 further comprising a braking system.

6. The mobility device of claim 5, wherein the braking system comprises an actuator located adjacent the handlebar, a cable passing through the front assembly and terminating in a braking block, the braking block comprising a braking pad, and the actuator selectively applying tension to the cable and the braking block to apply a braking force to the front wheels.

7. The mobility device of claim 1 further comprising a second rear wheel.

8. The mobility device of claim 2, wherein the rest is selectively rotatable and comprises multiple surfaces for placement of a user's limb(s).

9. The mobility device of claim 8 further comprising a locking pin to secure the position and orientation of the rest in a fixed position.

10. The mobility device of claim 1, wherein the front wheels and the at least one rear wheel are removable.

\* \* \* \* \*